United States Patent
Hastings et al.

(10) Patent No.: US 7,460,344 B2
(45) Date of Patent: Dec. 2, 2008

(54) DIRECT CURRENT AND BATTERY DISCONNECT APPARATUS

(75) Inventors: Jerome K. Hastings, Sussex, WI (US); Birger Pahl, Milwaukee, WI (US); Susan A. Glowinska, Brown Deer, WI (US); Mark G. Solveson, Oconomowoc, WI (US); Steven C. Schmalz, Franklin, WI (US); James R. Sumara, Clayton, NC (US); Davin R. Lee, Watertown, WI (US); Gilbert G. Jones, Clayton, NC (US); John E. Dunne, Cornelius, NC (US)

(73) Assignee: Eaton Corporation, Cleveland, OH (US)

( * ) Notice: Subject to any disclaimer, the term of this patent is extended or adjusted under 35 U.S.C. 154(b) by 194 days.

(21) Appl. No.: 11/610,279

(22) Filed: Dec. 13, 2006

(65) Prior Publication Data

US 2008/0143461 A1    Jun. 19, 2008

(51) Int. Cl.
*H02H 9/02* (2006.01)
(52) U.S. Cl. .................................. 361/42; 361/93.1
(58) Field of Classification Search .................. 361/42, 361/44, 93.1; 335/7; 702/58, 134
See application file for complete search history.

(56) References Cited

U.S. PATENT DOCUMENTS 6,577,138 B2    6/2003    Zuercher et al.

2005/0073293 A1    4/2005    Hastings et al.

FOREIGN PATENT DOCUMENTS

JP    11-136846    5/1999

OTHER PUBLICATIONS

BLI International, "Priority Start!® Starting is the Priority!", 2006, 2 pp.
Curtis Instruments, Inc., "Curtis/Albright Battery Disconnect Switches" ED150 Series, www.curtisinstruments.com, 2006, 1 p.
Cole Hersee Company, "Cole Facts Battery Selector & Master Disconnect Switches", http://www.colehersee.com, 2006, 2 pp.
Curtis Instruments, Inc., "DC Contactors And Disconnect Switches", 2006, 3 pp.
Connector Concepts, Inc., "Curtis/Albright enGage III™", 2006, 2 pp.

(Continued)

*Primary Examiner*—Danny Nguyen
(74) *Attorney, Agent, or Firm*—Martin J. Moran (57) ABSTRACT

A battery disconnect includes a housing, battery and load terminals, separable contacts electrically connected between the battery and load terminals, an operating mechanism structured to open and close the contacts, and a manual operator cooperating with the operating mechanism to open and close the contacts. A current sensor is structured to sense current flowing between the battery and load terminals. A circuit cooperates with the current sensor and the operating mechanism to trip open the contacts responsive to arc fault, overload and short circuit conditions associated with the sensed current. The circuit includes a first input structured to receive a remote on/off signal and a second input structured to receive an inhibit signal. The circuit cooperates with the operating mechanism to open and close the contacts responsive to the on/off signal, and to inhibit detection of the arc fault, overload and short circuit conditions responsive to the inhibit signal.

22 Claims, 6 Drawing Sheets

OTHER PUBLICATIONS

Delphi, "Electrical/Electronic Distribution Systems", www.delphi.com, 2004, 8 pp.

Delphi, "Battery Disconnect System", www.delphi.com, 2006, 1 p.

Control Devices, Inc., 1 First Technology Innovative Solutions, Automotive & Special Products Division, "Battery Cut Off (BCO)", 2006, 2 pp.

Intellitec, "Intellitec Battery Disconnect Relay", 2006, 1 p.

Tyco Electronics Corporation, "EV200 Series Contactor With 1 Form A (SPST-NO) Contacts Rated 500+ Amps, 12-900VDC", 2004, http://relays.tycoelectronics.com/datasheets/ev200.pdf, 2 pp.

BLI International, "Priority Start Priority Start Stop a dead battery before it happens!", 2006, 2 pp.

Galactic Headquarters, "Battery Disconnect for Remote Controls", 2006, 1 p.

DIRECT CURRENT AND BATTERY DISCONNECT APPARATUS

BACKGROUND OF THE INVENTION

1. Field of the Invention

This invention pertains generally to circuit interrupters and, more particularly, to direct current or battery disconnect apparatus.

2. Background Information

Known technology provides minimal protection for the electrical power circuit of a vehicle. For example, some vehicles, such as trucks or cars, use fuses. Recently, some automotive vehicles employ fuses and a relay disconnect that opens in the event of a crash.

Direct current (DC) disconnecting switches are known to provide a rapid mechanism to disconnect batteries or other DC power supplies in the event of serious electrical faults. For example, battery disconnect devices (BDDs) help protect and provide disconnection for both 14 VDC and 42 VDC systems. For example, a Delphi® BDD helps provide post-collision circuit protection for electrical cables connected to the battery. A base-level BDD is a low-cost, battery cable circuit protection device that responds during a significant collision. The device is actuated by a signal from the air bag controller or other crash sensors. Some BDDs enable the vehicle to remain operational, including the ability to restart without manual intervention, if the collision does not cause a battery cable circuit fault. Replacement of the BDD unit is necessary following actuation to provide proper operation in future conditions. An up-level version of the BDD is purported to provide more sophisticated functions and additional features.

A First Technology™ battery cut off switch (BCO) is employed by motor vehicles that require the electrical system (e.g., without limitation, 12 VDC; 24 VDC; 42 VDC) to be disconnected in a collision. Following a crash situation, the BCO typically responds from a remote signal in 3 mS, disabling the electrical system. Certain circuits (e.g., door locks, windows, hazard lights) identified by the user, however, will retain battery power. The BCO provides manual/electric disconnect and/or reset, short circuit protection, voltage/current monitoring, a visual status indicator and a battery saver.

An automatic heavy duty computerized on/off PriorityStart!® switching system protects battery voltage and starting power. If the battery voltage drains below 11.7 VDC when the engine is off, then it automatically disconnects the load, which permits the battery voltage to recover.

A known battery disconnect relay uses a latching relay, which is capable of carrying relatively heavy currents and requires no power to stay open or closed.

It is known to provide a remotely controlled battery disconnect that uses a remote control channel (e.g., a momentary switch) to shut off a battery from outside a car. The momentary switch is pushed once to connect the battery, and is pushed again to disconnect the battery feed.

It is also known to provide a dual battery system in which one battery is used for starting an engine while the other battery is used to power auxiliary loads. A battery selector switch enables the use of the first battery, the second battery or both batteries simultaneously.

It is further known to provide an AC induction motor controller designed for 24 to 80 VDC battery systems for a wide range of battery-powered vehicles. The motor controller includes battery monitoring, I/O control and CANbus communications.

Japanese Patent Application No. 11-136846 discloses an abnormal current shut-off device for an automobile wiring system wherein the current flowing through the wiring system is shut off independently of a fuse as a result of intermittent shorts in the wiring system which make it difficult for a fuse to melt. Current flowing through the wiring system connecting a DC power source and an electrical load is sensed by a current sensor, which generates a sensed output. When the sensed output is an abnormal level corresponding to a sudden major abnormal current, a dead short determining circuit determines it to be abnormal. When the sensed output is an abnormal level corresponding to an intermittent low abnormal current, a layer short determining circuit determines it to be abnormal. A MOSFET shuts off the flow of current to the wiring system based on either of these two determinations.

There is room for improvement in direct current or battery disconnect apparatus.

SUMMARY OF THE INVENTION

These needs and others are met by embodiments of the invention, which provide a direct current or battery disconnect apparatus in which a manual operator cooperates with an operating mechanism to open and close separable contacts, a circuit cooperates with a current sensor and the operating mechanism to trip open the separable contacts in response to an arc fault condition. The circuit also cooperates with the current sensor and the operating mechanism to trip open the separable contacts in response to at least one of an overload condition and a short circuit condition associated with sensed direct current, and such circuit also cooperates with the operating mechanism to open and close the separable contacts in response to a remote on/off signal.

In accordance with one aspect of the invention, a direct current disconnect apparatus comprises: a housing; a direct current terminal; a load terminal; separable contacts electrically connected between the direct current terminal and the load terminal; an operating mechanism structured to open and close the separable contacts; a manual operator cooperating with the operating mechanism to open and close the separable contacts; a current sensor structured to sense direct current flowing between the direct current terminal and the load terminal; and a circuit cooperating with the current sensor and the operating mechanism to trip open the separable contacts in response to an arc fault condition, the circuit also cooperating with the current sensor and the operating mechanism to trip open the separable contacts in response to at least one of an overload condition and a short circuit condition associated with the sensed direct current, the circuit comprising an input structured to receive a remote on/off signal remote from the housing, the circuit also cooperating with the operating mechanism to open and close the separable contacts in response to the remote on/off signal remote from the housing.

The input may be a first input; and the circuit may further comprise a second input structured to inhibit detection of at least one of the arc fault condition and the at least one of an overload condition and a short circuit condition.

As another aspect of the invention, a battery disconnect apparatus comprises: a housing; a battery terminal; a load terminal; separable contacts electrically connected between the battery terminal and the load terminal; an operating mechanism structured to open and close the separable contacts; a manual operator cooperating with the operating mechanism to open and close the separable contacts; a current sensor structured to sense current flowing between the battery terminal and the load terminal; and a circuit cooperating with the current sensor and the operating mechanism to trip open the separable contacts in response to at least one of an arc fault condition, an overload condition and a short circuit condition associated with the sensed current, the circuit comprising a first input structured to receive a remote on/off signal remote from the housing and a second input structured to receive a signal having an inhibit state, the circuit also cooperating with the operating mechanism to open and close the separable contacts in response to the remote on/off signal remote from the housing, and to inhibit detection of the at least one of an arc fault condition, an overload condition and a short circuit condition responsive to the inhibit state of the second input.

As another aspect of the invention, a battery disconnect apparatus comprises: a housing; a battery terminal; a load terminal; separable contacts electrically connected between the battery terminal and the load terminal; a manual operator cooperating with the operating mechanism to open and close the separable contacts; an operating mechanism structured to open and close the separable contacts; a current sensor structured to sense current flowing between the battery terminal and the load terminal; and a circuit cooperating with the current sensor and the operating mechanism to trip open the separable contacts in response to at least one of an arc fault condition, an overload condition and a short circuit condition associated with the sensed current, the circuit comprising a first input structured to receive a remote on/off signal remote from the housing, a second input structured to receive a signal having an inhibit state, and a number of outputs structured to indicate status of the battery disconnect apparatus external to the housing, the circuit also cooperating with the operating mechanism to open and close the separable contacts in response to the remote on/off signal remote from the housing, and to inhibit detection of the at least one of an arc fault condition, an overload condition and a short circuit condition responsive to the inhibit state of the second input.

As another aspect of the invention, a direct current disconnect apparatus comprises: a housing; a direct current terminal; a load terminal; separable contacts electrically connected between the direct current terminal and the load terminal; an operating mechanism structured to open and close the separable contacts; a current sensor structured to sense direct current flowing between the direct current terminal and the load terminal; and a circuit cooperating with the current sensor and the operating mechanism to trip open the separable contacts in response to an arc fault condition, the circuit also cooperating with the current sensor and the operating mechanism to trip open the separable contacts in response to at least one of an overload condition and a short circuit condition associated with the sensed direct current, the circuit comprising an input structured to receive a remote on/off signal remote from the housing, the circuit also cooperating with the operating mechanism to open and close the separable contacts in response to the remote on/off signal remote from the housing.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "vehicle" shall expressly include, but not be limited by, a land vehicle, a marine vehicle, an air vehicle or another motor vehicle.

As employed herein, the term "land vehicle" shall expressly include, but not be limited by, any land-based vehicles having pneumatic tires, any rail-based vehicles, any maglev vehicles, automobiles, cars, trucks, station wagons, sport-utility vehicles (SUVs), recreational vehicles, construction vehicles, off road vehicles, all-terrain vehicles, farm vehicles, fleet vehicles, motor homes, vans, buses, motorcycles, mopeds, campers, trailers, or bicycles.

As employed herein, the term "marine vehicle" shall expressly include, but not be limited by, any water-based vehicles, ships, boats, other vessels for travel on water, submarines, or other vessels for travel under water.

As employed herein, the term "air vehicle" shall expressly include, but not be limited by, any air-based vehicles, airplanes, jets, aircraft, airships, balloons, blimps, or dirigibles.

As employed herein, the term "number" shall mean one or an integer greater than one (i.e., a plurality).

The invention is described in association with a battery disconnect apparatus for a vehicle system, although the invention is applicable to a wide range of disconnect protection apparatus for direct current (DC) (e.g., without limitation, 12 VDC; 24 VDC; 42 VDC; 60 VDC; any suitable direct current voltage) powered systems.

Figure 1:
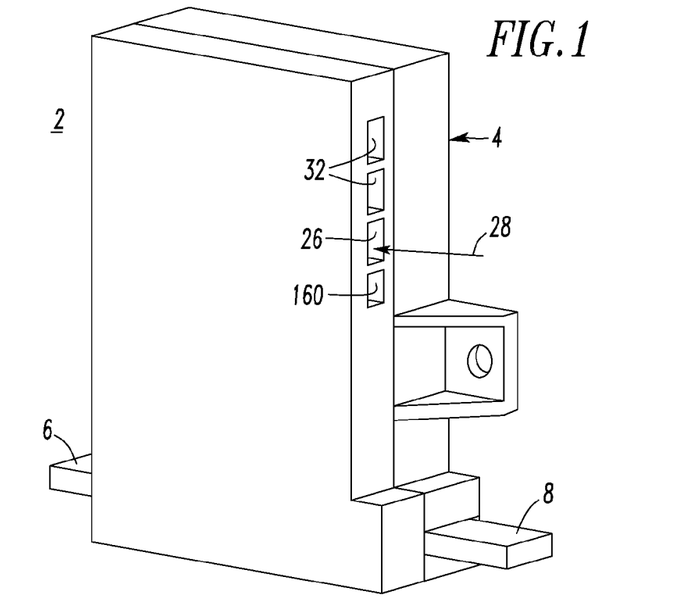
FIG. 1 is an isometric view of a battery disconnect apparatus in accordance with an embodiment of the invention.
Figure 2:
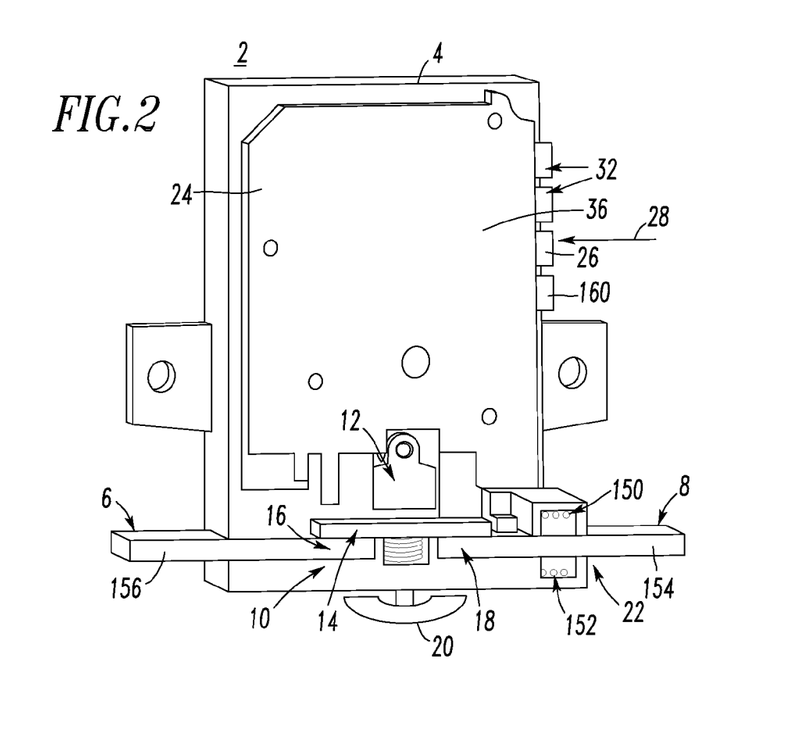
FIG. 2 is an isometric view of the battery disconnect apparatus of FIG. 1 with a portion of the housing removed to show internal structures.

Referring to FIGS. 1 and 2, a direct current (e.g., battery) disconnect apparatus 2 includes a housing 4, a direct current (e.g., battery-side (positive)) terminal 6, a load (e.g., load-side) terminal 8, separable contacts 10 (e.g., without limitation, double break; a mechanically held mechanism) electrically connected between the terminals 6,8, and an operating mechanism 12 (e.g., without limitation, a contactor including a latching solenoid structured to electrically connect and disconnect a vehicle's electrical system) structured to open and close the separable contacts 10. The example separable contacts 10 include a movable contact 14 carried by the operating mechanism 12, a first stationary contact 16 electrically connected to the direct current terminal 6 and a second stationary contact 18 electrically connected to the load terminal 8. A manual operator 20 (e.g., without limitation, manual ON/OFF switch) cooperates with the operating mechanism 12 to open and close the separable contacts 10.

The example battery disconnect apparatus 2 also includes a current sensor 22 structured to sense direct current flowing between the direct current terminal 6 and the load terminal 8. A circuit 24 (e.g., without limitation, a control printed circuit board; a controller to perform suitable control functions as will be described) cooperates with the current sensor 22 and the operating mechanism 12 to trip open the separable contacts 10 in response to an arc fault condition and at least one of an overload condition and a short circuit condition associated with the sensed direct current. The circuit 24 includes an input 26 structured to receive a remote on/off signal 28 remote from the housing 4. The circuit 24 also cooperates with the operating mechanism 12 to open and close the separable contacts 10 in response to the remote on/off signal 28.

EXAMPLE 1

Figure 3:
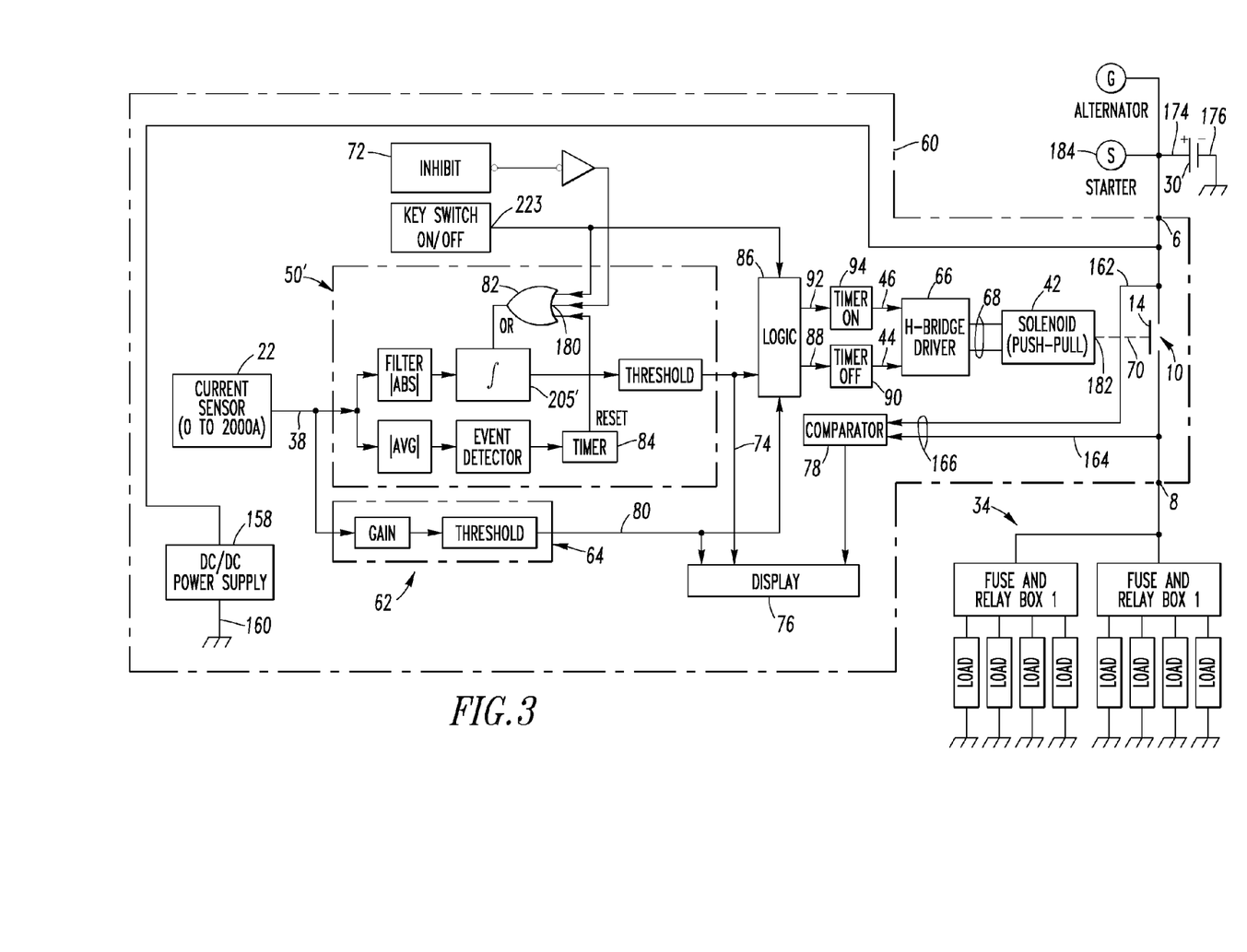
FIG. 3 is a block diagram of an analog battery disconnect apparatus in accordance with another embodiment of the invention.
Figure 4:
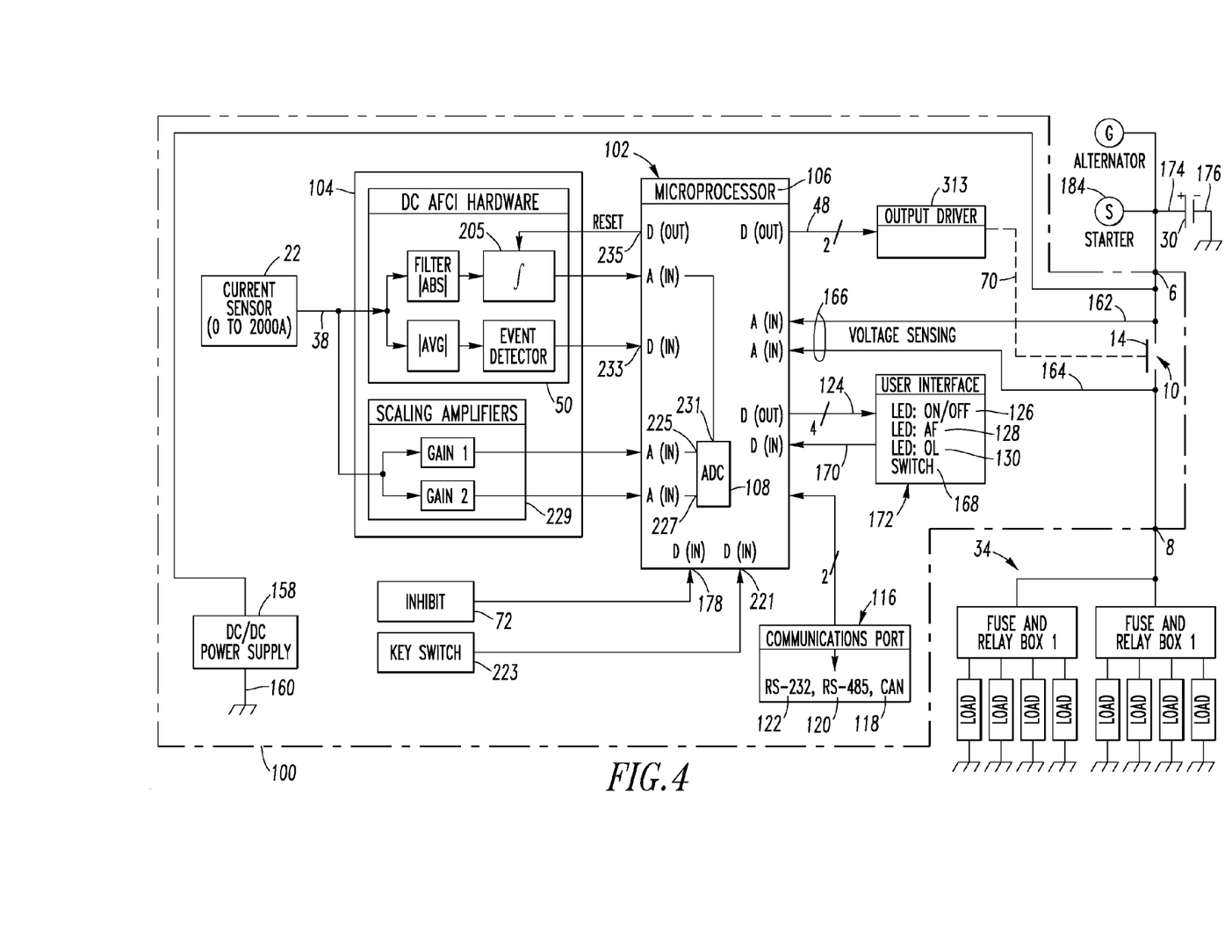
FIG. 4 is a block diagram of a digital battery disconnect apparatus including a microprocessor in accordance with another embodiment of the invention.

The example battery disconnect apparatus 2 provides protection to, for example, vehicles (not shown) from electrical fires related to the power available from a vehicle battery (e.g. 30 of FIGS. 3 and 4). The battery disconnect apparatus 2 also serves as the primary on/off disconnect for such vehicles. Preferably, the apparatus 2 includes a number of suitable interfaces 32 (e.g., without limitation, a number of communication interfaces and/or discrete digital I/O) to provide connection points to a vehicle control system (not shown) and/or an external display/control unit (not shown). The circuit 24 as will be described provides suitable fault protection (e.g., without limitation, circuit breaker protection; short circuit; overload; parallel arc fault; series arc fault) for a vehicle battery power circuit (e.g., 34 as shown in FIGS. 3 and 4).

EXAMPLE 2

The example circuit 24 includes a controller printed circuit board 36 that receives a sensed current signal (e.g., 38 of FIGS. 3 and 4) from the current sensor 22 and controls a latching solenoid (e.g., 42 of FIG. 3) of the operating mechanism 12 through an off pulse (e.g., 44 of FIG. 3) to trip open in response to detection of an arc fault, an overload condition or a short circuit condition. The controller printed circuit board 36 also controls the latching solenoid through the off pulse to open in response to the off state of the remote on/off signal 28, and controls the latching solenoid through an on pulse (e.g., 46 of FIG. 3) to close in response to the on state of such remote on/off signal.

EXAMPLE 3

The example manual operator 20 is a manual palm button (e.g., without limitation, push-off/pull-on mushroom button) employed to manually open and close the separable contacts 10 and override on and off pulses (e.g., 44, 46 of FIG. 3; 48 of FIG. 4) from the circuit 24 to the solenoid (e.g., 42 of FIG. 3) of the operating mechanism 12. In this context, the term "override" means that the contactor 70 (FIGS. 3 and 4) will be forced into the other position (e.g., on or off; a position that is different from the position that is requested by the analog or digital electronics of FIGS. 3 and 4). Here, the analog or digital electronics knows about this position because the voltages before and after the movable contact 14 are measured through the conductors 162, 164. For example, the contactor 70 may be turned off manually and then turned on electronically, or the contactor 70 may be turned on manually and then turned off electronically.

EXAMPLE 4

The current sensor 22 may be, for example, an anti-differential, error correcting (ADEC) current sensor as disclosed by U.S. Patent Application Publication No. 2005/0073293, which is incorporated by reference herein, although any suitable current sensor may be employed. The ADEC current sensor 22 is employed, for example, to sense direct current load current flowing from the battery terminal 6 to the load terminal 8, and to cooperate with the arc fault detection circuit of the circuit 24 to identify arc faults as will be described.

EXAMPLE 5

The arc fault detection circuit 50 (FIGS. 4 and 5) or 50' (FIG. 3) may be, for example, an arc fault detection circuit as disclosed by U.S. Pat. No. 6,577,138, which is incorporated by reference herein, although any suitable arc fault detection circuit may be employed. See, for example, U.S. Pat. Nos. 5,691,869 and 5,224,006, which are incorporated by reference herein.

EXAMPLE 6

The battery disconnect apparatus may be an analog battery disconnect apparatus 60 as shown in FIG. 3. Here, an analog trip circuit 62 is structured to respond to an arc fault condition, an overload condition (not shown) and a short circuit condition as will be described. The example ADEC current sensor 22 feeds the sensed current signal 38 into the arc fault detection (AFD) circuit 50' that determines arc faults and into a separate short circuit trip circuit 64. When a trip condition is detected, the AFD circuit 50' outputs a trip signal 74 to trip open the separable contacts 10 and to annunciate the trip condition on a display 76 (e.g., without limitation, a number of indicators; a graphic display; a personal computer display; a vehicle computer display).

A well known H-Bridge driver 66 provides a polarized coil power signal 68 (e.g., without limitation, +12 VDC, −12 VDC or 0 VDC, based upon the state of four switches, such as FETs) to the selected close or open solenoid coil (not shown) of the push-pull solenoid 42 (e.g., without limitation, a bidirectional latching solenoid) in order to control close (e.g., push) and open (e.g., pull) movement of a contactor 70. The driver 66 applies coil power through the signal 68 for a relatively short time to change the on/off state.

The AFD circuit 50' receives an inhibit signal 72 (e.g., without limitation, from an open collector output; pull to ground to inhibit) that, when active with an inhibit state, inhibits one, some or all protection functions (e.g., without limitation, inhibits detection of a number of the arc fault condition, the overload condition and the short circuit condition; during emergency conditions).

A comparator 78 monitors the voltage across the terminals 6, 8 in order to determine the state of the separable contacts 10 for the display 76.

The short circuit trip circuit 64 outputs a short circuit trip signal 80 to the display 76 and to a logic circuit 86. The logic circuit 86 may also respond to manual remote on/off signals (e.g., from a remote user interface (e.g., 172 of FIG. 4; an on/off key switch 223 of FIGS. 3 and 4)).

An OR gate 82 resets an integrator 205' of the AFD circuit 50' in response to the inhibit signal 72, the off state of the on/off key switch 223, and a timer 84. For example, any sufficiently large, fast change in current activates the timer 84. If enough arc activity is integrated before the timer 84 times out, then an arc fault is declared. Otherwise, the integrator 205' is reset.

When the on/off key switch 223 has the on state, the logic circuit 86 responds to the arc fault trip signal 74 or the short circuit trip signal 80 and outputs a trip signal 88. In turn, a timer 90 responsively outputs the off pulse 44 of suitable duration to the driver 66. Otherwise, when the on/off key switch 223 changes from the off state to the on state, the logic circuit 86 outputs a close signal 92. In turn, a timer 94 responsively outputs the on pulse 46 of suitable duration to the driver 66.

EXAMPLE 7

The battery disconnect apparatus may be a digital battery disconnect apparatus 100 as shown in FIG. 4. Here, a digital trip circuit 102 is structured to respond to arc fault, overload and short circuit conditions as will be explained. The example ADEC current sensor 22 feeds the sensed current signal 38 into an analog signal processing circuit 104. A microprocessor 106 including an analog-to-digital converter (ADC) 108 provides a digital current signal to routines 110, 112, 114 (FIG. 5) that determine respective short circuit, arc fault and over-current conditions. Preferably, a number of communications interfaces 116 (e.g., without limitation, controller area network (CAN) 118, such as SAE-J1939; RS-485 serial bus 120, such as SAE-J1708; RS-232 serial link 122) are provided for data logging, diagnostics, remote control capabilities and/or remote display capabilities. For example, the CAN 118 is structured to communicate with a vehicle communication bus (not shown), the RS-485 serial bus 120 is structured to communicate with another vehicle communication bus or data logging device (not shown), and the RS-232 serial link 122 is structured to communicate with a local computer (not shown) or data logging device (not shown). A number of outputs 124 are structured to interface a local or remote ON/OFF indicator 126, a local or remote arc fault indicator 128, and a local or remote overload or short circuit indicator 130, and to show the status of the switch 168.

EXAMPLE 8

Referring again to FIG. 2, two ADEC Hall current sensors 150, 152 are incorporated into the housing 4 and are located on each side of a conductive bus bar 154 that forms the second stationary contact 18 and the load-side terminal 8. Alternatively, the sensors 150, 152 may be located at the battery-side terminal 6. Another conductive bus bar 156 forms the first stationary contact 16 and the battery-side terminal 6. The current sensors 150, 152 measure load current flowing between the battery-side terminal 6 and the load-side terminal 8. The current sensors 150, 152 are preferably located symmetrically around the bus bar 154 such that they output the same magnitude of voltage (with opposite sign) for load current flowing through such bus bar. External fields excite the current sensors 150, 152 in the same direction. The current sensors 150, 152 are electrically connected to the printed circuit board 36 through conductors (not shown). The two output signals (not shown) from the current sensors 150, 152 are added together in a summing amplifier (not shown) on the printed circuit board 36 in order to cancel out any external field.

The battery disconnect apparatus 2 is electrically connected with one end of the bus bar 156 at the battery-side terminal 6 being electrically connected to the vehicle battery (e.g., 30 of FIGS. 3 and 4). The internal electronics and electromechanical components of the battery disconnect apparatus 2 are powered from the direct current voltage of that battery (e.g., through a suitable DC/DC power supply, such as 158 of FIGS. 3 and 4). A ground conductor (e.g., without limitation, ground wire; negative battery terminal; vehicle frame) is electrically connected to an electrical ground terminal 160 (FIGS. 1-4).

Preferably, voltage sense conductors 162, 164 (FIGS. 3 and 4) are provided on each side of the movable contact 14 in order to determine the state of the separable contacts 10 and the quality of the closed state (e.g., resistance measurement of the closed separable contacts 10 is possible using sensed current information from the current sensors 150, 152 and the sensed voltage 166 across the separable contacts 10). For example, this resistance information may be employed for diagnostic purposes. Alternatively, the on/off position of the apparatus 2 may be determined by magnetic sensors (not shown) placed in the vicinity of the separable contacts 10 to determine if the gap of such contacts is open or closed.

As shown in FIG. 4, a remote ON/OFF switch 168 provides a remote ON/OFF signal 170 to the microprocessor 106. The digital trip circuit 102 may also receive on/off commands from, for example, another remote source (e.g., without limitation, a vehicle computer (not shown); a CAN switch (not shown); direct wire control; other suitable wired or wireless communication interfaces). The example signal 170 is employed to remotely determine the ON/OFF state of the battery disconnect apparatus 2 as will be explained.

For initial operation, the local manual operator 20 (FIG. 2) and the remote switch 168 (e.g., without limitation, of a local or remote user interface 172) are both in the OFF position. The positive battery-side terminal 6 is electrically connected to the positive terminal 174 of the battery 30 and the ground terminal 160 is electrically connected to the negative terminal 176 of the battery 30 (or to chassis or vehicle ground). At this point, no protection is provided. The load of the vehicle battery power circuit 34 is electrically connected to the load-side terminal 8 and the negative battery terminal 176. The battery disconnect apparatus 100 is then turned on (e.g., by the remote switch 168). In response to a load fault, the battery disconnect apparatus 100 trips and indicates the nature of the fault on the corresponding indicators 128, 130. To reset the battery disconnect apparatus 100, for example, the remote switch 168 is turned to the OFF position. The protective functions of the battery disconnect apparatus 100 are inhibited by pulling the inhibit signal 72 to ground.

EXAMPLE 9

The battery disconnect apparatus 2 provides a number of protection functions and a number of communication interfaces. For example, the apparatus 2 may be combined with a remote display and/or remote switch (not shown) (e.g., without limitation, on the vehicle dash board (not shown)) that communicate over the CAN bus 118 in order to both turn the apparatus 2 on and off and to indicate the state thereof to the vehicle driver (not shown).

EXAMPLE 10

The battery disconnect apparatus 2 preferably employs information (e.g., without limitation, vehicle speed; transmission gear; RPM) from the CAN bus 118 in order to make sure that it is safe to disconnect power from the vehicle battery power circuit 34 in case of a fault. For example, in an emergency, it might be better to give an audible and/or visual indication to the vehicle driver (not shown) in the case of a power circuit fault instead of disconnecting the power circuit 34. For example, such indication may include indication of apparatus on state, off state, arc fault condition, overload condition and/or short circuit condition.

EXAMPLE 11

The battery disconnect apparatus 2 preferably includes an input (e.g., 178 of FIG. 4; 180 of FIG. 3) that receives the inhibit signal 72 in order to inhibit (e.g., override; disable) fault detection. For example, this input (e.g., without limitation, from a manual inhibit button (not shown)) may be employed during emergency conditions (e.g., without limitation, a vehicle passenger requires immediate medical attention and the vehicle must be started and/or driven regardless of the state of its power circuit 34) where it would be better to give an audible and/or visual indication to the vehicle driver (not shown) in the case of a fault instead of disconnecting the power circuit 34.

EXAMPLE 12

Many electrical faults can occur when the vehicle (not shown) is parked and unattended. The battery disconnect apparatus 100 preferably determines if the vehicle is parked (e.g., without limitation, by employing information from the CAN bus 118, such as zero vehicle speed; transmission gear in park) with no electrical loads of the power circuit 34 being turned on and, thus, provide protection against any unwanted load currents or fault currents.

EXAMPLE 13

The battery disconnect apparatus 100 preferably includes a battery monitoring function that can disconnect electrical loads of the power circuit 34 when it determines that the battery 30 would not, otherwise, have enough storage capacity to start the vehicle engine (not shown), thereby preventing the need to jump-start the vehicle in the case the battery 30 drains. For example, the apparatus 100 may provide an audible warning to the vehicle driver (not shown) in the case the driver rests in a vehicle sleeper cab (not shown) when such a condition is present.

EXAMPLE 14

The battery disconnect apparatus 2 preferably includes a power contact double break structure ("power head") formed by the movable contact 14 connected to the bi-directional latching solenoid 42 (FIG. 3) that drives the movable contact open and closed. The latching solenoid 42 preferably employs permanent magnets (not shown) in order that no power is consumed to hold the apparatus 2 in either the open or closed position.

The current sensor 22 is preferably a non-contact current sensor applied on the bus bar 154 and integrated into the "power head". The latching solenoid 42 has a center actuating rod 182 (FIG. 3) that is connected to the movable contact 14 on one end and to the manual operator 20 (FIG. 2) on the other end. This feature allows for the manual operator 20 to change the on/off state. For example, this is typically used to turn the battery disconnect apparatus 2 off in an emergency (e.g., without limitation, a vehicle electrical fire).

EXAMPLE 15

The separable contacts 10 are preferably structured to make and brake a load current flowing from the battery-side terminal 6 to the load-side terminal 8, in which such load current is at least as great as a maximum non-starter electrical load current of a vehicle (i.e., the maximum electrical load current of the power circuit 34, which excludes the load current of the starter 184).

Alternatively, the battery disconnect apparatus 2 may be located, for example, between the battery 30/alternator (G) and the starter 184, or may be employed to connect and disconnect the battery 30 from its entire power circuit.

EXAMPLE 16

The battery-side terminal 6 is structured to be energized with a 12 VDC voltage, a 24 VDC voltage or any suitable direct current voltage.

EXAMPLE 17

Figure 5:
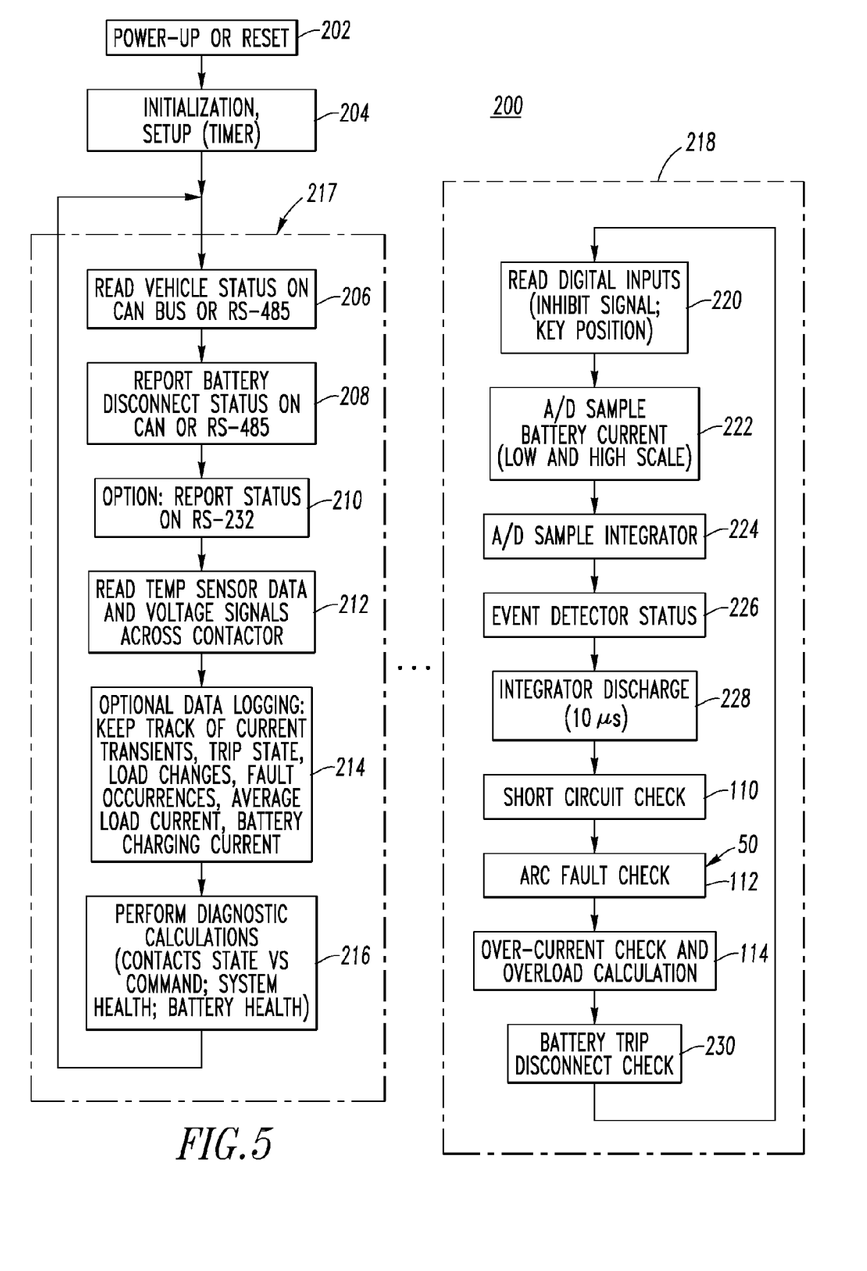
FIG. 5 is a flowchart of the firmware of the microprocessor of FIG. 4.

Referring to FIG. 5, a firmware routine 200 of the microprocessor 106 of FIG. 4 is shown. After power-up or reset at 202, a suitable initialization routine is executed at 204. This routine sets up, for example, internal timers (not shown) for resetting the integrator 205 of FIG. 4 and for providing a suitable timer interrupt period as will be discussed. Next, at 206, the vehicle status is read from the CAN bus 118 or RS-485 serial bus 120. Then, at 208, the connected/disconnected status of the battery 30 is reported on the CAN bus 118 or RS-485 serial bus 120. If an RS-232 serial link 122 is supported, then status is optionally reported at 210. Next, at 212, temperature sensor data and voltage signals across the contactor 70 are read. Then, at 214, data logging is optionally performed. This may include keeping track of current transients, trip state, load changes, fault occurrences, average load current and/or battery charging current. Next, at 216, diagnostic calculations are performed (e.g., actual versus commanded state of the separable contacts 10; system health; battery health). After 216, even steps 206-216 are repeated to provide relatively low-priority monitoring and reporting functions 217.

Running concurrently with the monitoring and reporting functions 217, an interrupt service routine 218 is periodically executed (e.g., without limitation, responsive to a timer interrupt; every 1 mS; periodically at a suitable interval), in order to provide time-critical, protection functions. First, at 220, various digital inputs are read. These may include, for example, the digital input 178 for the inhibit signal 72, and a digital input 221 for the on/off key switch 223. For example, if the key switch 223 is off, then the battery disconnect apparatus 2 monitors for unusual currents (e.g., unusually high currents for a vehicle being off, but within the rating of the apparatus 2) and gives a warning or disconnect. Next, at 222, the ADC 108 is read to sample the battery current. Preferably, two different analog-to-digital channels 225, 227 are employed to provide a low scale value and a high scale value as obtained from scaling amplifiers 229. Then, at 224, the ADC 108 is read to sample the integrator 205 from analog-to-digital channel 231. The Filter |ABS| of the arc fault detection circuit 50 is a band-pass filter (e.g., without limitation, centered around about 3 kHz) and rectifier. This filters out activity at that frequency band and rectifies it for subsequent integration by the integrator 205. The average (|AVG|) of the arc fault detection circuit 50 is a low-pass filter with a suitably long time constant. This averages all the fast activity in the current signal and gives a slow representation of the current. The Event Detector of the arc fault detection circuit 50 compares the slow averaged current signal with the real-time current signal. If the real-time signal is larger than the slow signal (by a suitable threshold), then an event is detected. This indicates that the microprocessor 106 should start adding integrations for arc fault detection.

Next, at 226, a digital input 233 is read to obtain the Event Detector status from the arc fault detection circuit 50. Then, at 228, a digital output 235 is set for about 10 µS, in order to reset the integrator 205. As has been discussed, at 110, 112 and 114, the short circuit check, the arc fault check, and the over-current check and overload calculation are sequentially performed. Finally, at 230, a battery trip disconnect check is performed. After 230, execution resumes with the monitoring and reporting functions 217. In response to the next timer interrupt, the interrupt service routine 218 resumes at 220.

EXAMPLE 18

Figure 6:
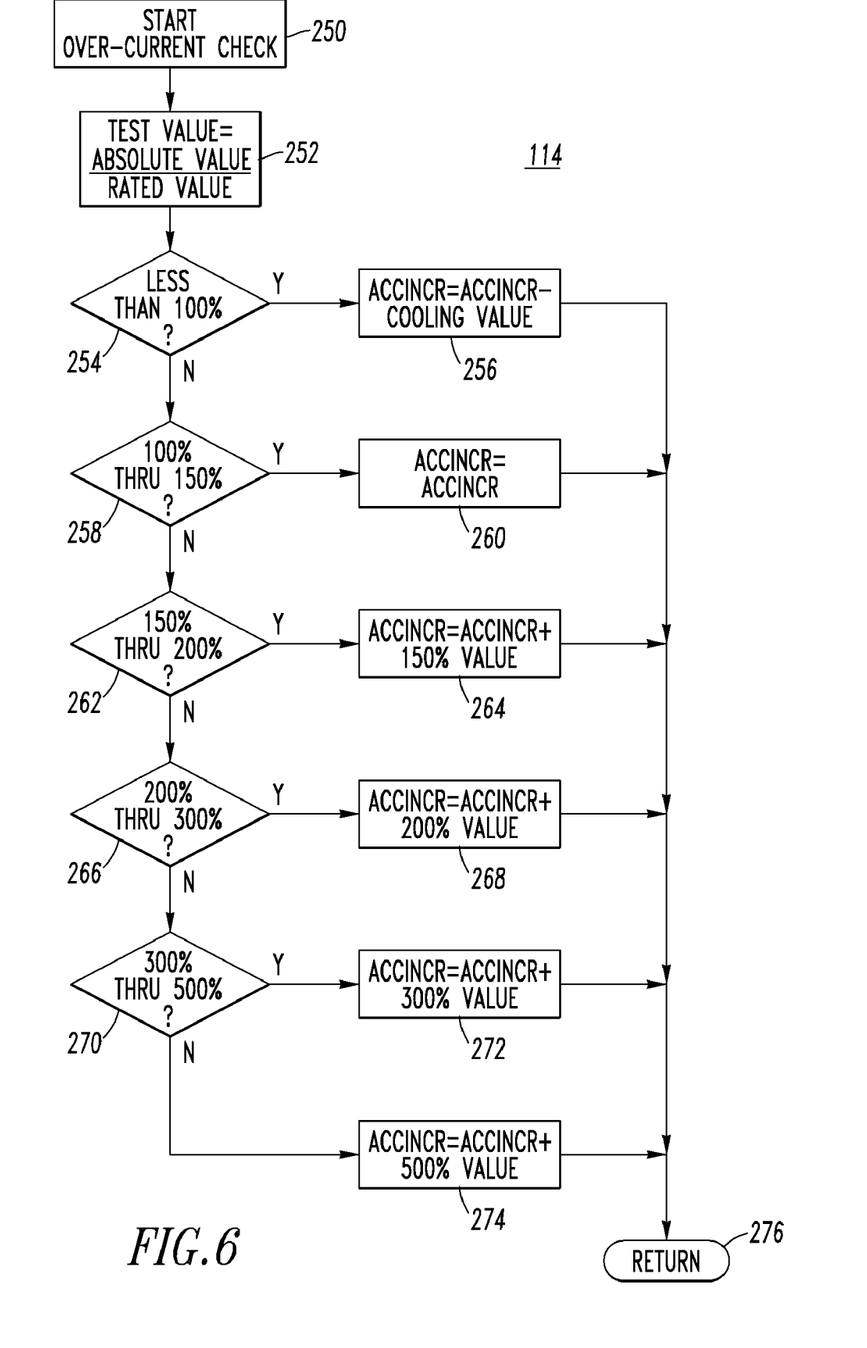
FIG. 6 is a flowchart of the over-current check routine of FIG. 5.

FIG. 6 shows the over-current check routine 114 of FIG. 5, which starts at 250. Next, at 252, a test value is determined by dividing the absolute value of the sensed battery current from the appropriate channel 225 or 227 of the ADC 108 by the rated value of the battery current. Next, at 254, it is determined if the test value of 252 is less than 100%. If so, then an internal value "accincr" is decreased by a suitable cooling value at 256. Steps 258 and 260 determine if the test value of 252 is between 100% and 150% and, if so, then the internal value "accincr" is not changed. Steps 262 and 264 determine if the test value of 252 is between 150% and 200% and, if so, then the internal value "accincr" is increased by a suitable 150% value. Steps 266 and 268 determine if the test value of 252 is between 200% and 300% and, if so, then the internal value "accincr" is increased by a suitable 200% value. Steps 270 and 272 determine if the test value of 252 is between 300% and 500% and, if so, then the internal value "accincr" is increased by a suitable 300% value. If the test fails at 270, then step 274 increases the internal value "accincr" by a suitable 500% value. Finally, after each of even steps 256-274, the routine 114 returns at 276.

EXAMPLE 19

Figure 7:
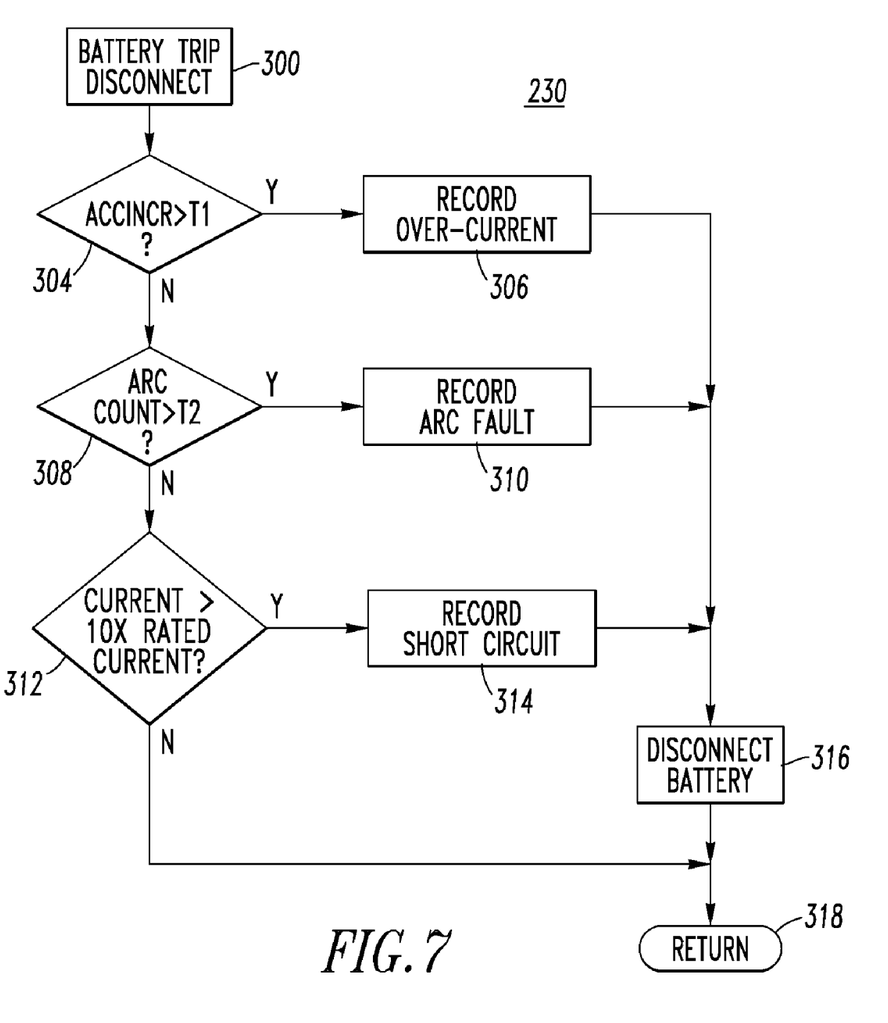
FIG. 7 is a flowchart of the battery trip disconnect routine of FIG. 5.

FIG. 7 shows the battery trip disconnect routine 230 of FIG. 5. After starting at 300, the routine 230 determines if the value "accincr" of FIG. 6 is greater than a first threshold (T1). If so, then at 306, an over-current condition is determined. For example, this condition is reported by the communications interfaces 116 and is indicated by the indicator 130. If the test at 304 failed, then at 308, it is determined if an arc fault count maintained by the arc fault routine 112 of FIG. 5 is greater than a second threshold (T2). If so, then at 308, an arc fault condition is determined. For example, this condition is reported by the communications interfaces 116 and is indicated by the indicator 128. If the test at 308 failed, then at 312, it is determined if the sensed current is greater than, for example, 10 times rated current as determined by the short circuit check 110 of FIG. 5. If so, then at 314, a short circuit condition is determined. For example, this condition is reported by the communications interfaces 116 and is indicated by an indicator (not shown). After either 306 or 310 or 314, at 316, the battery 30 is disconnected by outputting an off pulse 48 to output driver 313, in order to cause the contactor 70 to open the separable contacts 10. Finally, if the test at 312 failed, or after 316, the routine 230 returns at 318.

Although separable contacts 10 are disclosed, suitable solid state separable contacts may be employed. For example, the disclosed battery disconnect apparatus 2 includes a suitable circuit interrupter mechanism, such as the separable contacts 10 that are opened and closed by the operating mechanism 12, although the invention is applicable to a wide range of circuit interruption mechanisms (e.g., without limitation, solid state or FET switches; circuit breaker separable contacts) and/or solid state based control/protection devices (e.g., without limitation, drives; soft-starters).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A direct current disconnect apparatus comprising:
   a housing;
   a direct current terminal;
   a load terminal;
   separable contacts electrically connected between said direct current terminal and said load terminal;
   an operating mechanism structured to open and close said separable contacts;
   a manual operator cooperating with said operating mechanism to open and close said separable contacts;
   a current sensor structured to sense direct current flowing between said direct current terminal and said load terminal; and
   a circuit cooperating with said current sensor and said operating mechanism to trip open said separable contacts in response to an arc fault condition, said circuit also cooperating with said current sensor and said operating mechanism to trip open said separable contacts in response to at least one of an overload condition and a short circuit condition associated with said sensed direct current, said circuit comprising an input structured to receive a remote on/off signal remote from said housing, said circuit also cooperating with said operating mechanism to open and close said separable contacts in response to said remote on/off signal remote from said housing.

2. The direct current disconnect apparatus of claim 1 wherein said current sensor is an anti-differential, error correcting current sensor.

3. The direct current disconnect apparatus of claim 1 wherein said input is a first input; and wherein said circuit further comprises a second input structured to inhibit detection of at least one of said arc fault condition and said at least one of said overload condition and said short circuit condition.

4. The direct current disconnect apparatus of claim 1 wherein said separable contacts are structured to make and break a load current flowing from said direct current terminal to said load terminal, said load current being at least as great as a maximum non-starter electrical load current of a vehicle.

5. The direct current disconnect apparatus of claim 1 wherein said circuit further comprises an interface structured to communicate with a vehicle communication bus.

6. The direct current disconnect apparatus of claim 1 wherein said circuit further comprises an interface structured to communicate with a controller area network.

7. The direct current disconnect apparatus of claim 1 wherein said circuit further comprises an interface structured to communicate with an RS-485 serial bus.

8. The direct current disconnect apparatus of claim 1 wherein said circuit further comprises an interface structured to communicate with a remote computer or a data logging device through a communication link.

9. The direct current disconnect apparatus of claim 8 wherein said communication link is an RS-232 serial link.

10. The direct current disconnect apparatus of claim 1 wherein said direct current terminal is structured to be energized with one of a 12 VDC voltage, a 24 VDC voltage and a 42 VDC voltage.

11. The direct current disconnect apparatus of claim 1 wherein said input is a first input; and wherein said circuit further comprises a second input structured to receive a signal having an inhibit state, said circuit being structured to inhibit detection of at least one of said arc fault condition and said at least one of said overload condition and said short circuit condition responsive to the inhibit state of said second input.

12. A battery disconnect apparatus comprising:
a housing;
a battery terminal;
a load terminal;
separable contacts electrically connected between said battery terminal and said load terminal;
an operating mechanism structured to open and close said separable contacts;
a manual operator cooperating with said operating mechanism to open and close said separable contacts;
a current sensor structured to sense current flowing between said battery terminal and said load terminal; and
a circuit cooperating with said current sensor and said operating mechanism to trip open said separable contacts in response to at least one of an arc fault condition, an overload condition and a short circuit condition associated with said sensed current, said circuit comprising a first input structured to receive a remote on/off signal remote from said housing and a second input structured to receive a signal having an inhibit state, said circuit also cooperating with said operating mechanism to open and close said separable contacts in response to said remote on/off signal remote from said housing, and to inhibit detection of said at least one of said arc fault condition, said overload condition and said short circuit condition responsive to the inhibit state of said second input.

13. The battery disconnect apparatus of claim 12 wherein said circuit further comprises an interface structured to communicate with at least one of a remote computer or a data logging device through a communication link, and an interface structured to communicate with a vehicle communication bus.

14. The battery disconnect apparatus of claim 12 wherein said circuit further comprises an analog trip circuit structured to respond to said arc fault condition, said overload condition and said short circuit condition.

15. The battery disconnect apparatus of claim 12 wherein said circuit further comprises a digital trip circuit structured to respond to said arc fault condition, said overload condition and said short circuit condition.

16. A battery disconnect apparatus comprising:
a housing;
a battery terminal;
a load terminal;
separable contacts electrically connected between said battery terminal and said load terminal;
a manual operator cooperating with said operating mechanism to open and close said separable contacts;
an operating mechanism structured to open and close said separable contacts;
a current sensor structured to sense current flowing between said battery terminal and said load terminal; and
a circuit cooperating with said current sensor and said operating mechanism to trip open said separable contacts in response to at least one of an arc fault condition, an overload condition and a short circuit condition associated with said sensed current, said circuit comprising a first input structured to receive a remote on/off signal remote from said housing, a second input structured to receive a signal having an inhibit state, and a number of outputs structured to indicate status of said battery disconnect apparatus external to said housing, said circuit also cooperating with said operating mechanism to open and close said separable contacts in response to said remote on/off signal remote from said housing, and to inhibit detection of said at least one of said arc fault condition, said overload condition and said short circuit condition responsive to the inhibit state of said second input.

17. The battery disconnect apparatus of claim 16 wherein said number of outputs of said circuit comprises a first interface structured to communicate with at least one of a remote computer or a data logging device through a communication link, and a second interface structured to communicate with a vehicle communication bus.

18. The battery disconnect apparatus of claim 16 wherein said number of outputs are structured to interface at least some of a remote ON/OFF indicator, a remote arc fault indicator and a remote overload or short circuit indicator.

19. The battery disconnect apparatus of claim 16 wherein said number of outputs of said circuit comprises a controller area network.

20. The battery disconnect apparatus of claim 16 wherein said circuit further comprises a ground terminal structured to be electrically connected to a ground operatively associated with a battery voltage.

21. The battery disconnect apparatus of claim 16 wherein said first input is further structured to receive the remote on/off signal from a remote manual on/off switch.

22. A direct current disconnect apparatus comprising:
a housing;
a direct current terminal;
a load terminal;
separable contacts electrically connected between said direct current terminal and said load terminal;
an operating mechanism structured to open and close said separable contacts;
a current sensor structured to sense direct current flowing between said direct current terminal and said load terminal; and
a circuit cooperating with said current sensor and said operating mechanism to trip open said separable contacts in response to an arc fault condition, said circuit also cooperating with said current sensor and said operating mechanism to trip open said separable contacts in response to at least one of an overload condition and a short circuit condition associated with said sensed direct current, said circuit comprising an input structured to receive a remote on/off signal remote from said housing, said circuit also cooperating with said operating mechanism to open and close said separable contacts in response to said remote on/off signal remote from said housing.

* * * * *